June 13, 1950 G. R. LARKIN 2,510,986
ELECTRICALLY HEATED PITOT TUBE
Filed Feb. 16, 1949
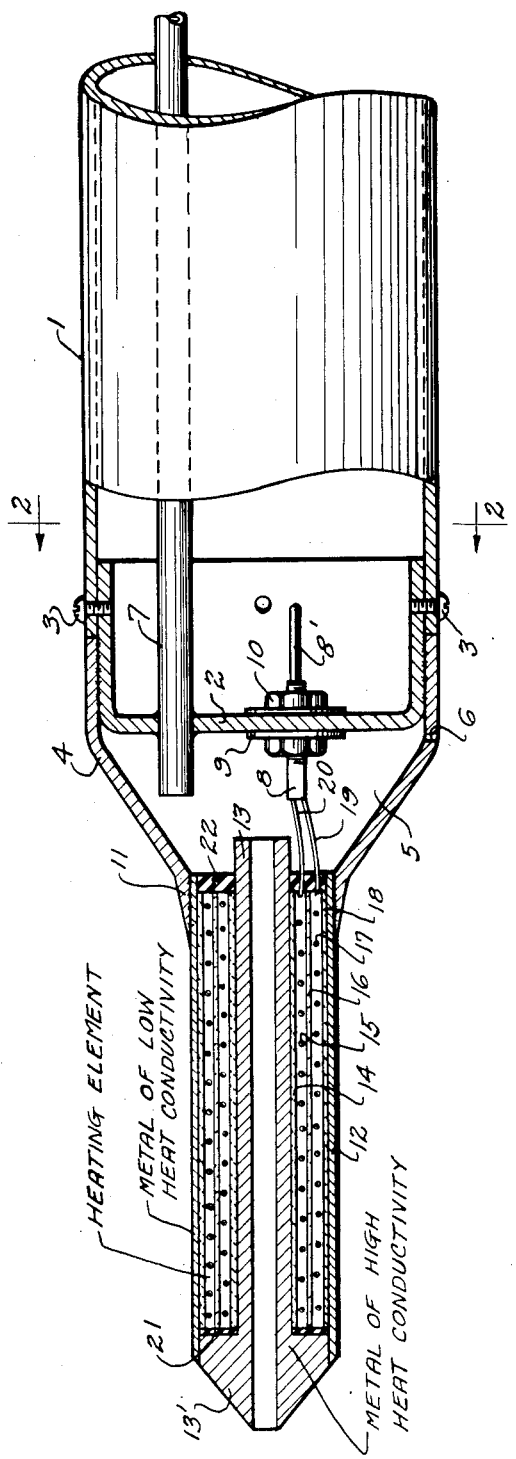
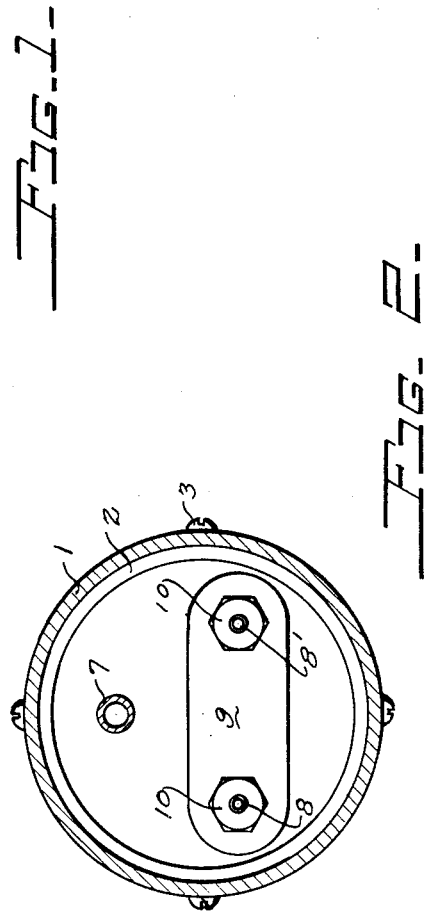
INVENTOR.
GEORGE R. LARKIN
BY Wade Koontz AND
ATTORNEY
Charles L. Burgoyne,
AGENT Patented June 13, 1950

2,510,986

UNITED STATES PATENT OFFICE 2,510,986

ELECTRICALLY HEATED PITOT TUBE

George R. Larkin, Dayton, Ohio

Application February 16, 1949, Serial No. 76,741

1 Claim. (Cl. 73—212)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an improved heated Pitot pressure air speed tube for use on aircraft.

The primary object of the invention is to provide a Pitot tube in which heat applied thereto by means of a heating element is caused to flow or be conducted to the open outer end of the tube by use of a highly conductive core member.

A further object of the invention is to provide a Pitot tube including a central tube open to the atmosphere at one end and having a heating jacket thereon extending over the major portion of the length thereof and including a tubular housing around the heating jacket made of a material having a much lower specific thermal conductivity than the material used in the central tube open to the atmosphere.

Another object of the invention is to provide a heated Pitot tube which includes means to apply the available heat in an efficient and direct manner to the point where it is most desired.

The above and other objects of the invention will become apparent upon reading the following detailed description taken in conjunction with the drawing, in which;

Fig. 1 is a longitudinal cross sectional view on an enlarged scale of the present air speed Pitot tube and showing a portion of the supporting mast or tube usually associated therewith on an aircraft.

Fig. 2 is a vertical cross sectional view taken on the line 2—2 of Fig. 1.

In detecting and indicating air speed on aircraft it is necessary to provide a tubular connection from the indicating instrument within the aircraft to a forwardly extending air speed tube mounted on the aircraft in the free air stream, and usually on the leading edge of a wing at some distance to one side of the aircraft fuselage. Since the air speed tube must be open to the atmosphere it may become clogged with ice formations if there is no heating means provided to maintain the tube at a temperature above the freezing point of water. According to the principles of the present invention such a heating means is provided and is combined in the tube structure in such a way as to make the heat available at the open forward end of the air speed tube where ice is most likely to build up and eventually close off the opening in the tube. While the invention is illustrated in a Pitot pressure tube adapted to sense the dynamic pressure head it should be understood that it is readily adapted for application to similar pressure sensing tubes, such as static pressure tubes which are provided with one or more openings on the lateral sides of a forwardly projecting tubular structure. Since the icing hazard may result in closing off the opening of the pressure sensing tube it is the purpose of the present invention to conduct as much of the available heat as possible to the material forming the tube conducting the air pressure and to the material forming the mouth of the tube.

Considering the drawing it will be seen that a small portion of a supporting mast or tube 1 is shown which normally extends to the right and makes rigid connection to the framework of an aircraft in order to support the air speed tube on the aircraft with the longitudinal axis of the tube extending fore-and-aft and with the forward or open end of the tube facing directly into the air stream. At the outer end of the mast 1 the air speed tube is secured thereto by means of a cup member 2 fitting within the mast and secured thereto by a plurality of screws 3. The cup 2 also fits snugly into the forwardly extending housing member 4 and is welded or secured therewithin in any desired manner. Furthermore the forward end of the mast 1 is brought into abutment with the housing member 4 before the screws 3 are threaded into place as shown. Within the housing member 4 and forwardly of the forward wall of cup 2 is a pressure chamber 5 which is open to the atmosphere only through a tiny hole 6 at the lowest point thereof to provide water drainage from the chamber 5. In order to conduct the pressure developed within the chamber 5 to the indicating instrument within the aircraft there is provided a tube 7 extending through and integrally connected to the forward wall of the cup 2. Also secured on this same wall of the cup 2 are a pair of electrical connecting members 8, which are well insulated from the wall and from each other by means of non-conducting strips 9 through which the connectors 8 pass. The connectors are secured in the positions shown by means of nuts 10 threading onto the central portions of the connectors. The rearwardly extending end portions of the connectors 8 provide smooth prongs 8' to be received within a suitable electrical connector having a potential source connected thereto.

The housing member 4 includes a frusto-conical wall portion terminating in a tapering annular flange 11 to receive an outer tubular housing 12 around the Pitot tube structure. The flange 11 and the tubular housing 12 are brazed or welded at their juncture and the forward end of the housing 12 is also firmly connected to the head portion 13' of the Pitot tube 13. The tube 13 being of reduced diameter throughout the major portion of its length, there is thus provided an elongated annular recess to receive a suitable heating element. For the usual installation this should be in the form of heating coils wound with wire or ribbon having a relatively high electrical resistance. Thus when an electrical current is passed therethrough the wire coils heat up and heat is slowly dissipated by the heat paths having the least resistance to the flow of heat. The heating element in the illustrated construction takes the form of an inner layer of mica insulation 14, an inner layer of resistance wire 15, an intermediate layer of mica insulation 16, an outer layer of resistance wire 17 and an outer layer of mica insulation 18. All these consecutive layers are of generally tubular or cylindrical form and it is understood that the two layers of resistance wire are connected together at the forward ends thereof. The rearward ends of the wire layers provide end leads 19 and 20 which are affixed to the connectors 8 as shown. To further insulate the wires from the tube structure there may be provided an insulating ring 21 at the forward end of the heating element and an insulating ring 22 at the rearward end of the heating element, these rings being made of any suitable material such as asbestos-reinforced ceramic composition or even several layers of mica.

The most important feature of the present air speed tube is the manner in which the heat developed by the heating element is utilized to best advantage to avoid the formation of ice layers around or within the pressure tube 13. The manner in which this is accomplished also tends to avoid wasteful dissipation of the heat to the outside atmosphere. Accordingly the outer tubular housing 12 is made of a metal having a high resistance to the flow of heat while the tube 13, including the head portion 13' thereof, is made of a metal having a low resistance to the flow of heat. The metal components may be selected according to available materials but should have fairly high melting points and resistance to corrosion. For the pressure tube 13 it is suggested that the metal be copper or aluminum, both of which have excellent heat conductive properties. For the outer tubular housing 12 it is suggested that the metal be stainless steel, brass or German silver, all of which are rather poor conductors of heat. In order to provide a table of comparison for the above noted metals and alloys the heat conductive properties thereof are tabulated as follows, in the order of their conductivity:

| Metal | Specific Thermal Conductivity |
| --- | --- |
| Copper | 1.0 |
| Aluminum | 0.62 |
| Brass (70% Cu and 30% Zn) | 0.25 |
| German Silver | 0.07 |
| Stainless Steel (Type 304) | 0.024 |

In order to minimize conduction of heat to the outer tubular housing member 12, the outer insulating layer 18 may be of several thicknesses of mica or may even include a layer of asbestos paper to more effectively prevent the dissipation of heat to the outer member. The less heat that is permitted to escape by conduction to the outer tubular housing 12, the more will be available for conduction along the pressure tube 13 toward the outer or forward end thereof where the icing hazard is the most pronounced. Heat which is conducted to this tube 13 tends to be lost to the air within the tube by radiation but a very substantial part thereof will flow along the tube walls toward the ends thereof and these walls are made fairly thick to assist such flow. In any event there will always be sufficient heat reaching the head portion 13' of the tube 13 to maintain it at a temperature above freezing, even though the ambient air temperature is below freezing or even below zero. The head portion 13' has sufficient thickness to maintain a maximum temperature around the tube opening even though the outer surface of the head portion may be cooled below the maximum temperature by cold air passing thereover. The various insulating layers and rings described are chiefly for the purpose of electrically insulating the heating element from the metal parts of the tube structure and also partly to keep out dust, moisture and corrosive gases. However as pointed out above the outer tubular layer of insulation 18 may be made more substantial in thickness to reduce heat flow to the outer tubular wall or housing 12. Any moisture that reaches the pressure chamber 5 by way of the tube 13 will gravitate to the bottom of the chamber and may then drip out by way of the small aperture 6. Furthermore with the heating element in operation there will be enough heat radiated from the rearward end portion of the tube 13 to maintain the temperature in the chamber 5 above the freezing point of water.

The present Pitot tube or air speed tube provides a compact, efficient and fairly inexpensive device suitable for use on all aircraft flying under the most severe cold weather conditions. The preferred choice of metals for the housing 12 and tube 13 is stainless steel and copper respectively but as noted above there are other possible choices. The annular joint between the two elements of different conductivity may cause some difficulty if aluminum is used for the tube 13, but for most materials mentioned a high temperature braze will effect a good connection. In some instances the joint may be made with silver solder or by welding. The present device uses the electric current supplied in a very direct and economical manner to achieve the heating effect desired. Thus it is possible to reduce the current drain caused by the heated Pitot tube to a minimum. In stead of a heating element which consumes around 175 watts, as in some of the presently installed devices, it is possible to get very good results under all conditions with a heating element consuming only 75 to 80 watts when installed in a heated Pitot tube made in accordance with the present invention. It is of course understood that the electrical circuit to the heating element is completed by the aircraft pilot or engineer only when the outside air temperature indicator shows that icing conditions prevail. However there are temperature responsive switches available to make this operation automatic and reduce the hazard inherent in manual control.

The embodiments of the invention herein shown and described are to be regarded as illustrative only and it is to be understood that the

I claim:

A Pitot tube comprising, a metallic tubular element having an integral head portion at the forward end substantially greater in diameter than the major portion of said tubular element, to provide a radially extending shoulder between the major portion of said tubular element and the outer circumferential surface of said head portion, an electrical heating element of generally tubular form surrounding said tubular element and extending from said shoulder to a point on said tubular element adjacent to the rearward end thereof, a cylindrical insulation element surrounding said electrical heating element throughout its length, a metallic tubular housing surrounding said insulation element and said heating element and having its forward end extending over the outer circumferential surface of said head portion and rigidly secured thereto throughout the circumference thereof, an insulating ring abutting the rearward end of said electrical heating element and filling a portion of the annular space between said tubular element and said tubular housing near the rearward ends thereof, said tubular element and integral head portion thereof being made of a metal having a higher specific thermal conductivity than the metal of said tubular housing, a housing member rigidly secured to the rearward end of said tubular housing to provide a chamber rearwardly of said Pitot tube with the rearward end of said tubular element extending thereinto, a bottom wall portion of said housing member being provided with a small aperture opening to the outside atmosphere, and a pressure sensing tube extending into said chamber and adapted to conduct the pressure developed within said chamber to an indicating instrument.

GEORGE R. LARKIN.

REFERENCES CITED

The following references are of record in the file of this patent:

UNITED STATES PATENTS

| Number | Name | Date |
| --- | --- | --- |
| 1,644,815 | Broady et al. | Oct. 11, 1927 |
| 2,229,740 | Helmore | Jan. 28, 1941 |
| 2,399,370 | McOrlly | Apr. 30, 1946 |
| 2,482,701 | Anderson | Sept. 22, 1949 |